(12) United States Patent
Strausbaugh et al.

(10) Patent No.: US 7,426,701 B2
(45) Date of Patent: Sep. 16, 2008

(54) INTERACTIVE DRILL DOWN TOOL

(75) Inventors: James W Strausbaugh, Clarkston, MI (US); Charlene Gasparovich, Shelby Township, MI (US); Karen Strausbaugh, Clarkston, MI (US); Earl Vogel, Oxford, MI (US); Kenneth Mills, Northwood, OH (US)

(73) Assignee: Chrysler LLC, Auburn Hills, MI (US)

( * ) Notice: Subject to any disclaimer, the term of this patent is extended or adjusted under 35 U.S.C. 154(b) by 826 days.

(21) Appl. No.: 10/657,520

(22) Filed: Sep. 8, 2003

(65) Prior Publication Data
US 2005/0055662 A1 Mar. 10, 2005

(51) Int. Cl.
G06F 15/00 (2006.01)
G06F 13/00 (2006.01)

(52) U.S. Cl. ................ 715/835; 715/503

(58) Field of Classification Search ............ 706/11, 706/45, 50; 715/503, 514, 840–841, 762–765, 715/835
See application file for complete search history.

(56) References Cited

U.S. PATENT DOCUMENTS

| | | | |
|---|---|---|---|
| 4,700,318 A | 10/1987 | Ockman | |
| 5,321,610 A * | 6/1994 | Breslin | 705/9 |
| 5,506,783 A * | 4/1996 | Tanaka et al. | 700/101 |
| 5,913,201 A * | 6/1999 | Kocur | 705/9 |
| 5,946,661 A | 8/1999 | Rothschild et al. | |
| 6,141,598 A | 10/2000 | Nam | |
| 6,233,493 B1 | 5/2001 | Cherneff et al. | |
| 6,240,328 B1 | 5/2001 | LaLonde et al. | |
| 6,256,651 B1 * | 7/2001 | Tuli | 705/9 |
| 6,906,709 B1 * | 6/2005 | Larkin et al. | 345/419 |
| 6,993,712 B2 * | 1/2006 | Ramachandran et al. | 715/234 |
| 2002/0054101 A1 * | 5/2002 | Beatty | 345/764 |
| 2003/0011601 A1 * | 1/2003 | Itoh et al. | 345/440 |
| 2003/0233267 A1 * | 12/2003 | Hertel-Szabadi | 705/9 |
| 2004/0034662 A1 * | 2/2004 | Austin et al. | 707/104.1 |
| 2005/0010606 A1 * | 1/2005 | Kaiser et al. | 707/200 |
| 2006/0053043 A1 * | 3/2006 | Clarke | 705/8 |
| 2006/0238538 A1 * | 10/2006 | Kapler et al. | 345/440 |

OTHER PUBLICATIONS

Bartak,R et. al. "Integrated Modelling for Planning, Scheduling, and Timetabling Problems" 2001.*
Decker,K.S. "Coordinating Human and Computer Agents" 1998.*
Erol,K. et. al. "Semantics for Hierarchical Task-Network Planning" 1994.*
Erol,K. et. al. "Complexity Results for HTN Planning" 1994.*
Harrison,T.H. et. al. "The Design and Performance of a Real-time CORBA Event Service" 1997.*

(Continued)

*Primary Examiner*—Kevin Nguyen
(74) *Attorney, Agent, or Firm*—Ralph E. Smith

(57) ABSTRACT

An interactive drill down tool having a first level of information defining the steps necessary to complete an objective. A second level of information defines interrelationships between work positions. A third level of information defines what each work position must accomplish. The first, second, and third levels are organized such that the second level is accessible from the first level and the third level is accessible from the second level.

17 Claims, 4 Drawing Sheets

OTHER PUBLICATIONS

Myers, K.L. et. al. "Passat: User-centric Planning Technology" Third International NASA Workshop on Planning and Scheduling for Space. Oct. 2002.*

Smith, D.E. et. al. "Bridging the Gap Between Planning and Scheduling" 2000.*

Sarin, S.K. et al. "A process model and system for supporting collaborative work" ACM. 1991.*

Shneiderman, B. et al. "The future of graphic user interfaces: personal role managers" British Computer Society Conference on Human-Computer Interaction, Scotland. Aug. 1994.*

Smith, S.F. et al. "Constructing and maintaining detailed production plans: investigations into the development of knowledge-based factory scheduling systems" Al Magazine. 1986.*

* cited by examiner

INTERACTIVE DRILL DOWN TOOL

FIELD OF THE INVENTION

The present invention relates to organizing and identifying the tasks performed by individuals within an organization and more particularly to an interactive drill down tool used to organize and to identify the tasks performed by individuals within an organization.

BACKGROUND OF THE INVENTION

The free flow of information within large, complicated organizations is a recurring challenge among today's businesses and governments. Specifically, in order to complete a complicated goal or objective, whether it be building an automobile, designing a part, or performing a service, the efforts of numerous individuals typically must be defined and controlled in an auditable format. Each individual typically has a specific series of tasks to perform and each individual is located within an organized and detailed hierarchy. Moreover, these individuals do not work within a vacuum, and the output of any one individual may be relied upon by numerous others. This creates a web of interdependencies among individuals within the organization that can span departments, divisions, and beyond the organization itself.

In order to increase efficiency within the organization, it is desirable to provide employees with a full disclosure of this web of interdependencies. Specifically, it is desirable to disclose for every individual within the organization who is providing what work product, when the work product must be provided, and who the work product must be provided to. However, disseminating this web of interdependencies can be very difficult, and there remains a need to provide a method of easily and quickly providing this information.

SUMMARY OF THE INVENTION

An interactive drill down tool for organizing information is provided. The drill down interactive tool has a first level of information defining the steps necessary to complete an objective. A second level of information defines interrelationships between work positions. A third level of information defines what each work position must accomplish. The first, second, and third levels are organized such that the second level is accessible from the first level and the third level is accessible from the second level.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
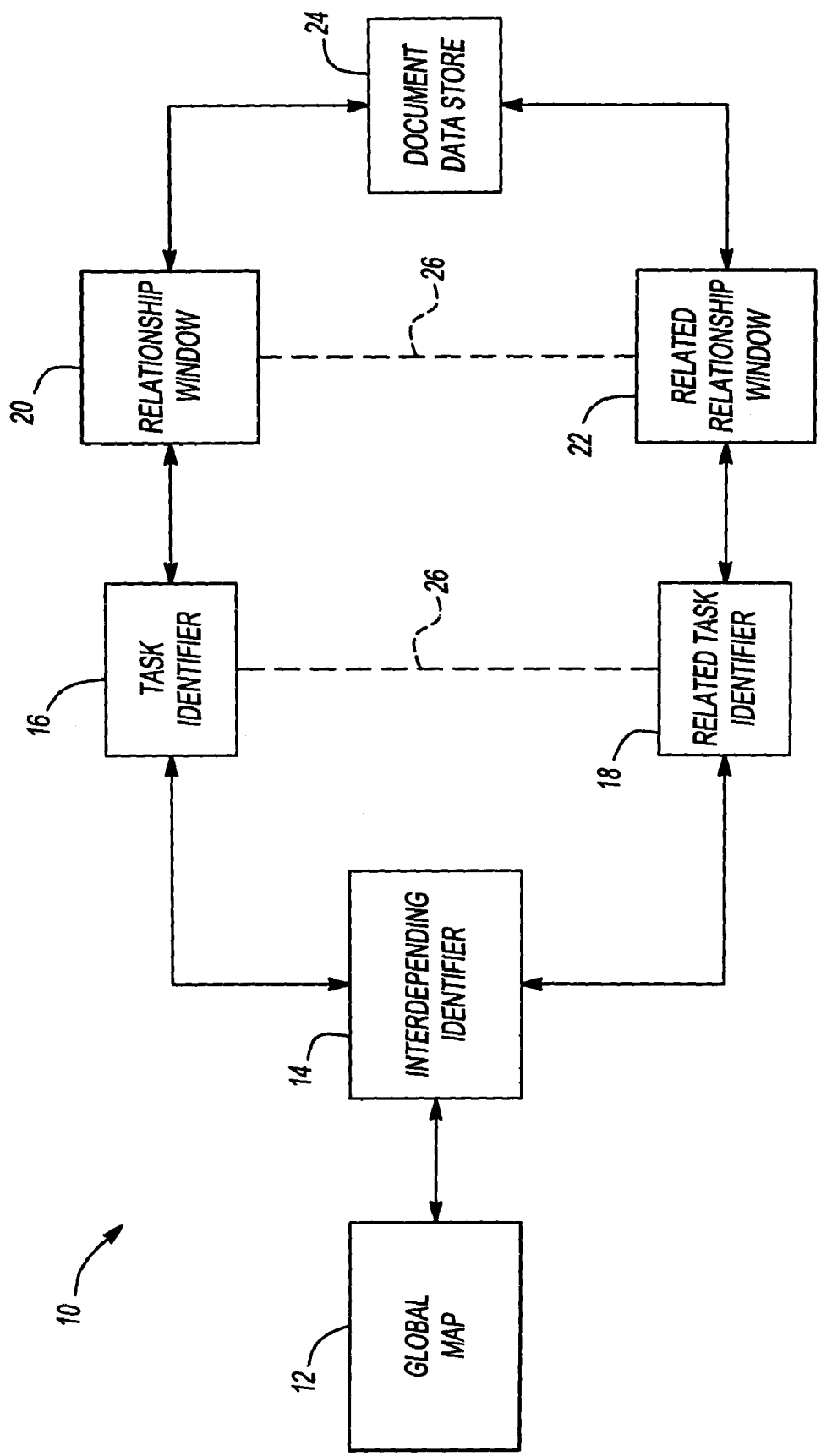
FIG. 1 is a schematic illustration of a drill down tool constructed according to the principles of the present invention.

Referring to FIG. 1, there is illustrated an interactive drill down task identifier tool (tool), indicated generally by reference numeral 10. The tool 10 is preferably used on a computer system (not shown) as an interactive online program. In this regard, the various levels of the tool 10 will be described as "windows", referring to the screens displayed on a computer monitor. However, the tool 10 is not intended to be limited to computer applications and the "windows" of the tool 10 may be sheets of paper or any other method of conveying information. Moreover, the tool 10 is preferably used with organizations having multiple tasks performed by multiple individuals wherein these tasks interrelate with one another. However, the tool 10 is not limited in the scope of its application and may be used with any organization.

The purpose of the tool 10 is to define the job of an individual employee within a company or other organizations by providing what the employee is expected to do, when the employee is expected to do it, who the employee must interact with to do it, and how the employee is to do it, all the while providing easy access to relevant information to do it with. Also, for any specific employee using the tool 10 (hereinafter referred to as the "user"), the tool 10 provides the web of interdependencies that affect the user and those that the user in turn affects. In this regard, the tool 10 not only identifies all the necessary steps to complete an objective, but also allows the user to examine the job definition for all the different other employees who must do some activity or task to help complete the objective. The tool 10 accomplishes this by providing when those other employees must perform those tasks, how they are to accomplish those tasks, who they must interact with to accomplish those tasks, and any documents or additional information relating to accomplishing those tasks. All of this information is then stored within "levels" relating to a hierarchy of information easily accessible by the user.

The highest level of the tool 10 generally includes a global map window 12. The global map window 12 is a representation of the necessary steps to meet an objective. This objective may be to perform a process, attain a goal, produce a product, or complete any other complicated task. For example, the necessary steps may be those steps necessary to build an automobile. The global map window 12 preferably includes a timeline, a process chart that identifies the major tasks to be performed, and any other graphical or written data necessary to communicate to the user the major steps that need to be completed to attain the objective. Furthermore, the global map window 12 may be specific to one job classification (e.g. specific to one user) or alternatively may be a general outline of all the steps necessary to complete the objective.

From the global map window 12 the user can access a lower level of the tool 10 having an interdependency identifier window 14. The interdependency identifier window 14 tells the user when other employees are doing something related to the user's job. Specifically, the interdependency identifier window 14 identifies all those other employees that have specific tasks to perform in order to complete any given necessary step in the global map window 12. In an exemplary embodiment described below, the interdependency identifier window 14 is displayed on the global map window 12 with each major task. At this level the user may select a lower level of information including a task identifier window 16 and a related task identifier window 18.

The task identifier window 16 defines the user's job in relation to a specific task. The task identifier window 16 includes all the specific tasks the user must perform in order to accomplish a given necessary step from the global map window 12. As such, the task identifier window 16 is specifically tailored to the current user of the tool 10 and depends on the user's role within the overall global map. The task identifier window 16 informs the user what the user must do and when the user must accomplish it by. This information may be conveyed in graphical form as a flow chart, or as a series of listed tasks, or in any other convenient format. The task identifier window 16 enables the user to easily determine the work product the user is responsible for under a given timeframe. At this level the user may return to the interdependency identifier window 14.

The related task identifier window 18 is another employee's job description for any given major task. Only another employee who has a task or work product relating to (e.g. interdependent on) the user's tasks is listed in the related task identifier window. Specifically, the related task identifier window 18 may be accessed by the user to determine what other users (e.g. other employees) must accomplish in order to complete a necessary step in the global map window 12. Just as with the task identifier window 16, the related task identifier window 18 is specific to a given employee depending on that other employee's role within the global map. The related task identifier window 18 includes all the specific tasks that the other employee must perform and when it must be performed. This allows the user to determine who is doing what and how it relates to what the user is doing. At this level the user may return to the interdependency identifier window 14.

From the task identifier window 16 the user may access a lower level of information found in a relationship window 20. The relationship window 20 includes all the other employees, and any other entity (e.g. suppliers, government officials, customers, etc.), that the user must interact with in order to complete any specific task. The relationship window 20 may further disclose the relationship between the other employees and entities with the user, and describe what must be done with those other employees and entities (e.g. what work product the user must provide to them and what work product the user can expect from them). The information may be provided in list, chart, or any other suitable format. The user may return to the task identifier window 16 from the relationship window 20.

From the related task identifier window 18 the user may access a lower level of information found in a related relationship window 22. The related relationship window 22 shows the user who the other employee is dependent on for a work product. In this regard, the related relationship window 22 includes all the employees and entities that the other employee must interact with in order to complete any specific task. The related relationship window 22 lets the user know what the other employee must do to complete a specific task that relates to the user's specific task. Again, the information may be displayed in list, chart, or any other format. By disclosing what other employees are doing, the tool 10 promotes accountability and communication between separate users. The user may return to the related task identifier window 18 from the related relationship window 22.

From both relationship windows 20, 22, the user may access a final level of information found in a data store of relevant documents 24. The relevant documents 24 are a collection of various pieces of information in various formats relating to the specific tasks that any given user must perform. Examples include, but are not limited to, technical manuals, scientific studies, component diagrams, and product information. The user may return to either of the relationship windows 20, 22 from the relevant documents 24.

As noted above, for each specific user, the specific tasks and relationships within the task identifier window 16 and relationship window 20 will be different, depending on the user's role in achieving the overall goal. However, since all windows eventually lead to the lowest level at the relevant documents 24, any changes made therein are reflected at the higher levels. Moreover, as indicated schematically by lines 26, the task identifier windows 16, 18 and the relationship charts 20, 22 are each interrelated such that edits to one task identifier window for a given user can effect the task identifier window for another user. This creates an interdependency for different users within the tool 10.

Figure 2:
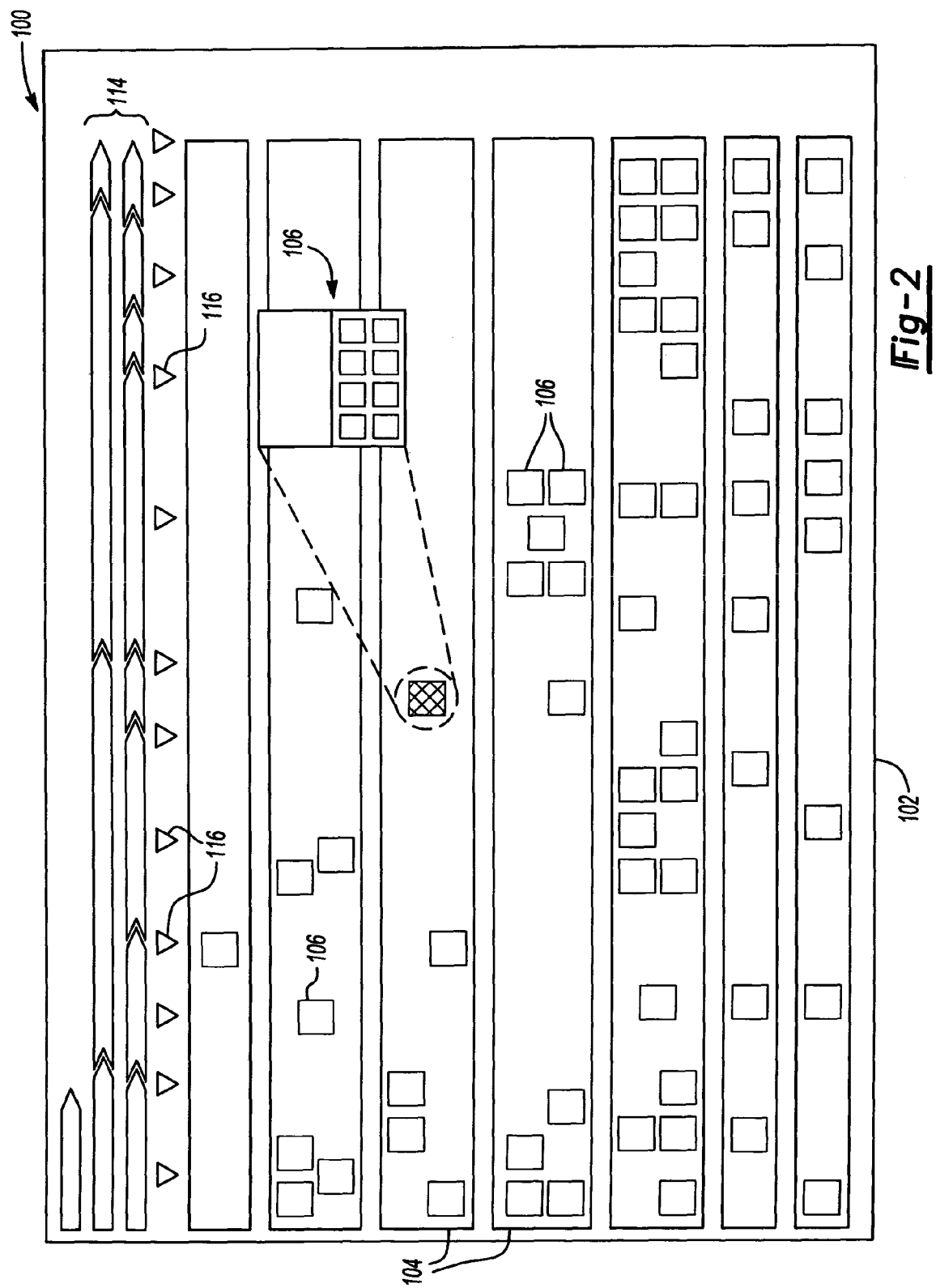
FIG. 2 is an illustration of an exemplary first level of the tool of FIG. 1.

Turning now to FIG. 2, a preferred embodiment of a process roadmap constructed according to the principles set forth above is indicated generally by reference numeral 100. The process roadmap 100 is preferably used to organize the development of an automobile, although various other projects may employ the design of the process roadmap 100 without deviating from the scope of the invention.

The process roadmap 100 includes a chart 102 divided into a plurality of rows 104 corresponding to various general areas of work that must be performed to complete the process. These general areas may include, for example, brand visions/marketing plans, program definition, business planning and approval, program planning and resource management, design and development, product preparation, sourcing and logistics, build and test, and programs and process assessment. It is to be understood, however, that the rows 104 are not limited to these particular areas.

Figure 3:
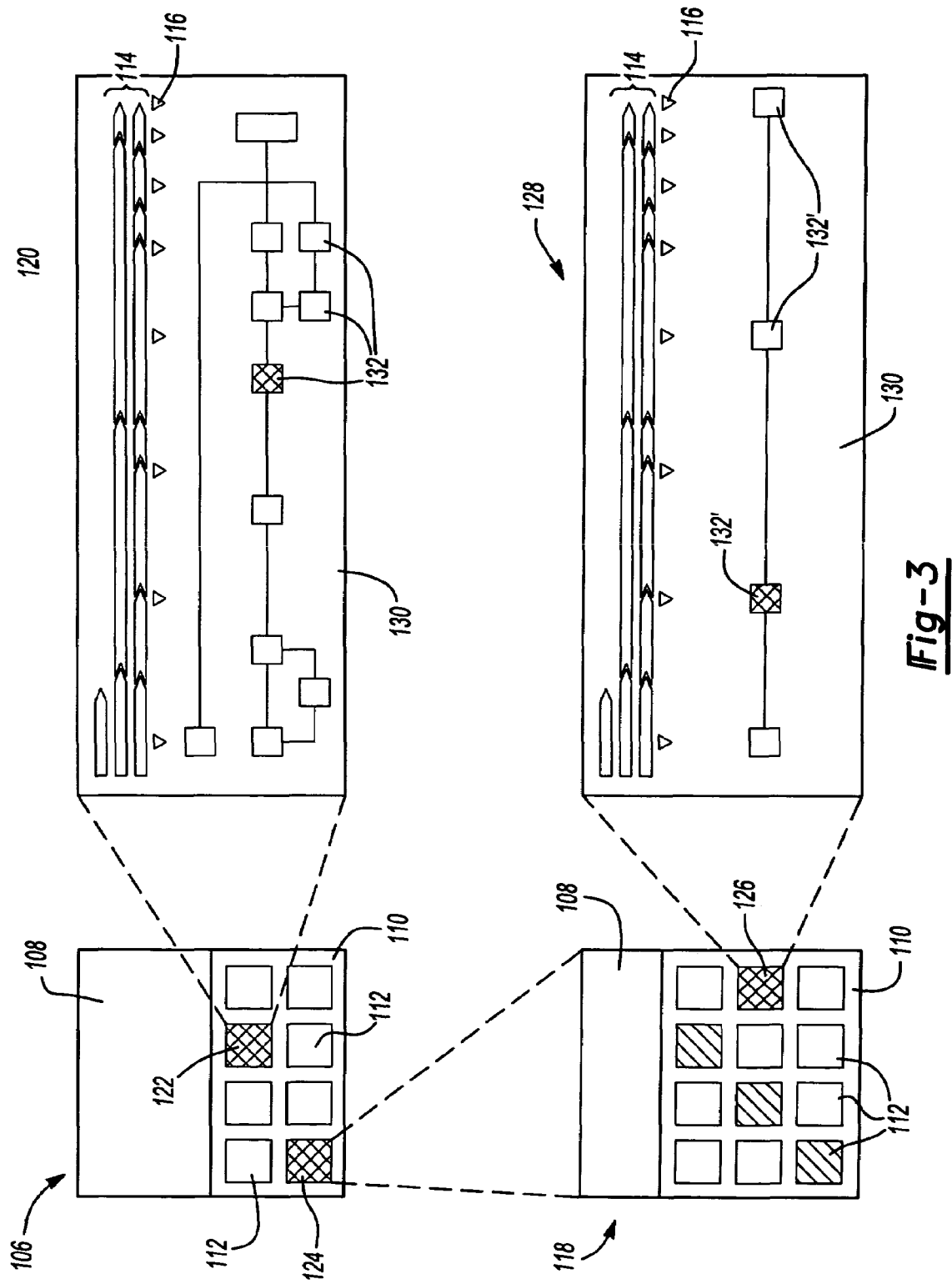
FIG. 3 is an illustration of an exemplary second level of the exemplary tool of FIG. 1.

Within each row 104 are a plurality of major tasks 106 represented as boxes within the chart 102. The major tasks 106 each correspond to a general activity that must be performed prior to completion of the process. As best seen in FIG. 3, each box of the major tasks 106 are divided into two portions including a task portion 108 and a relationship portion 110. The task portion 108 includes a brief description of the major task to be completed. The relationship portion 110 is a plurality of icons 112 that are either highlighted or unhighlighted. Each icon 112 corresponds to a group or division within the organization that employs the process roadmap 100. If an icon 112 is highlighted, that indicates that at least one employee within the group has a specific task to perform relating to a given major task 106. If an icon is not highlighted, that indicates that no one within that group has a specific task to perform relating to a given major task 106.

Returning to FIG. 2, the chart 102 further includes a timeline 114 with a plurality of milestones 116. The major tasks 106 are positioned on the chart 102 relative to the timeline 114. The timeline 114 indicates by when each major task 106 must be completed. The milestones 116 act as interim audit points such that the process may not advance past a milestone 116 until such time as all the major tasks 106 prior to the milestone 116 on the timeline 114 have been completed or recovery plans are put in place to mitigate the risk.

The user may select a major task 106 from the chart 102 and activate one of the highlighted icons 112 to bring up either a second major task box 118 or a job classification roadmap 120. Whether a second major task box 118 or a job classification roadmap 120 activates depends on whether the group corresponding to the icon 112 selected has further classifications therein or only a single job classification. In this regard, the icons 112 essentially represent the hierarchy of the organization that employs the process roadmap 100. In the particular example provided, selecting the icon numbered 122 leads to the user's job classification roadmap 120, and selecting the icon numbered 124 leads to the second major task box 118.

The second major task box 118 includes the task portion 108 and the relationship portion 110 of the major task box 106. However, the icons 112 within the relationship portion 110 correspond to the organization of the group and will vary accordingly. Moreover, only those icons 112 having activities to perform to complete the given major task 106 will be highlighted. For example, activating the icon numbered 126 leads to a second job classification roadmap 128.

The job classification roadmap 120 is the user's job description. The second job classification roadmap 128 is another employee's job description that the user has chosen to examine by activating icon 126. Although both roadmaps are shown together, it is to be understood that one may be selected individually, and any number of the icons 112 may be selected.

The job classification roadmaps 120, 128 each include a chart 130 having the timeline 114 and the milestones 116 of the global chart 102. Each roadmap 120, 128 includes a plurality of specific task boxes 132 arranged on the chart 130 in relation to the timeline 114. Each specific task box 132 corresponds to a specific task that must be performed under the job classification. These specific task boxes 132 are specific to the given job classification and vary accordingly.

Figure 4:
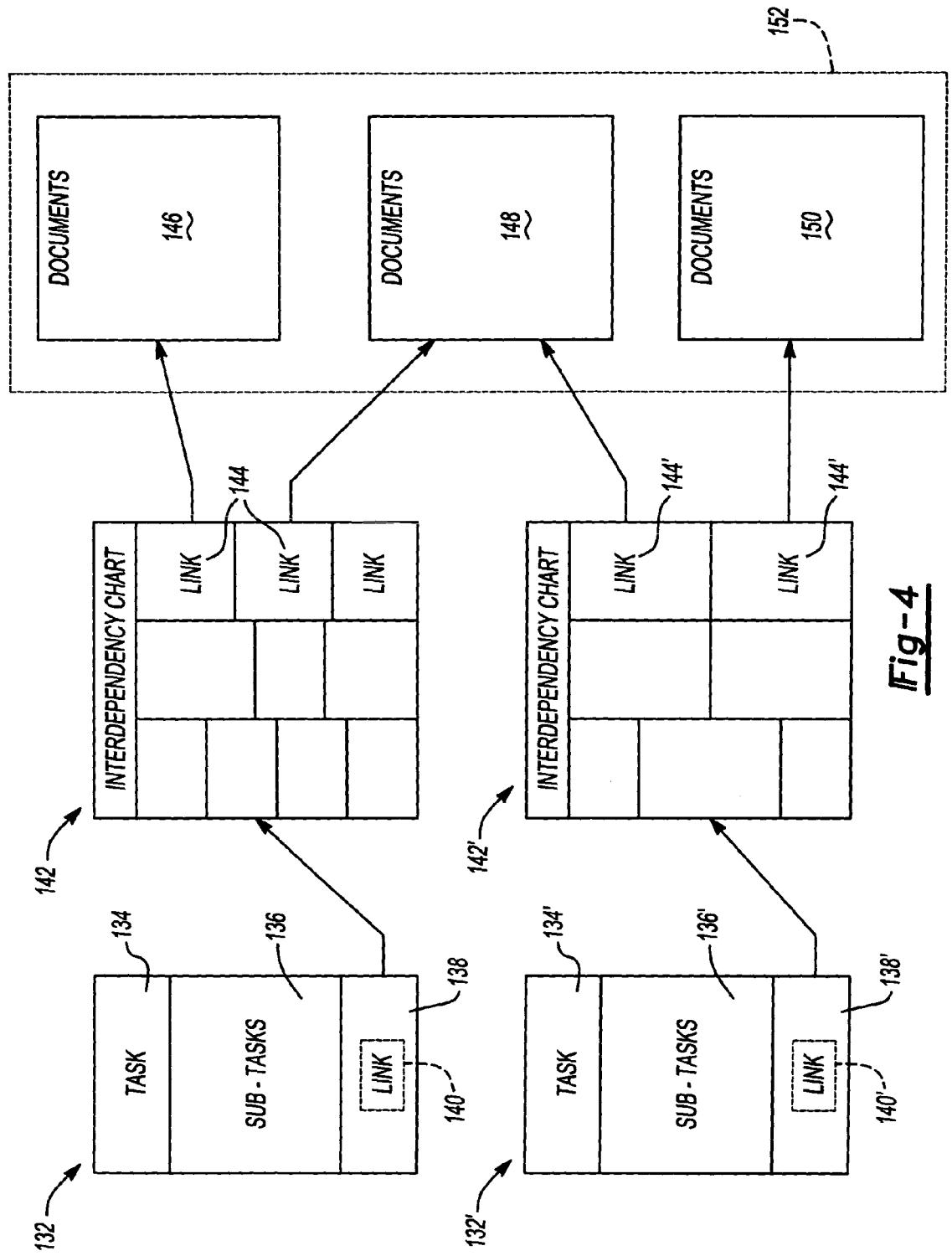
FIG. 4 is an illustration of an exemplary third level of the tool of FIG. 1.

As best seen in FIG. 4, two specific task boxes 132, 132' from the job classification roadmap 120 and another from the second job classification roadmap 128, respectively, have been expanded to further describe the detail therein. Each specific task box 132, 132' includes a name portion 134, 134' a sub-task portion 136, 136' and an interaction portion 138, 138'. The name portion 134, 134' includes a brief description of the specific task. The sub-task portion 136, 136' includes a listing of all the sub-tasks that must be performed in order to complete the specific task listed in the name portion 134, 134'. The interaction portion 138, 138' includes a link 140, 140' that is selectable by the user to access an interdependency chart 142, 142'.

The interdependency chart 142, 142' is specific to each specific task and each job classification and vary accordingly. The interdependency chart 142, 142' includes a list of what deliverables (e.g. work products) the user or other employee must provide, to whom the user or other employee must provide them, what deliverables the user or other employee can expect, and any interdependencies between employees, other organizations, or customers. Each interdependency chart 142, 142' further includes one or more links 144, 144' to a plurality of documents. In the particular example provided, three documents numbered 146, 148, and 150 have been provided stored within a data store 152, it being understood that any number of documents may be employed.

The documents 146, 148, 150 include any relevant information that the user of the process roadmap 100 may need in completing any given specific task. The documents 146, 148, 150 are stored in a common data store (not shown). Any given document, for example document 148 in FIG. 4, may be commonly referred to by any number of job classification roadmaps within the organization (e.g. more than one employee may find the document 148 relevant in the performance of their job). Accordingly, any changes made to document 148 are registered in both the user's job classification roadmap 120 but in the second job classification roadmap 128. This creates an interdependency at the lowest level of the process roadmap 100.

Using the process roadmap 100, a user can quickly and easily determine what exactly the user must do at any given stage of the timeline 114. Moreover, the user can determine who or what must perform specific tasks before the user can complete their own specific tasks. By providing the user with the information of what the user and other employees are doing, great gains in efficiency may be realized.

The description of the invention is merely exemplary in nature and, thus, variations that do not depart from the idea of the invention are intended to be within the scope of the invention. Such variations are not to be regarded as a departure from the spirit and scope of the invention.

What is claimed is:

1. An interactive organizational tool implemented by a computer program executed by one or more processors comprising:
   a first level of visually represented information comprising steps necessary to complete an objective;
   a second level of visually represented information comprising interrelationships between work positions, wherein each of said work positions are represented by at least one icon that corresponds to one or more workers within one of a plurality of groups within an organization that work on one or more of said steps;
   a third level of visually represented information comprising tasks each work position must accomplish for said one or more of said steps;
   wherein the first, second, and third levels are organized such that the second level is accessible from the first level and the third level is accessible from the second level.

2. The interactive organizational tool of claim 1, wherein the third level of visually represented information further comprises visually represented sub-steps within said steps that each of said work positions is responsible for completing.

3. The interactive organizational tool of claim 2, further comprising a fourth level of visually represented information comprising a work product and a destination for the work product for each sub-step.

4. The interactive organizational tool of claim 3, further comprising a data store having a plurality of documents therein, the data store accessible from the fourth level of visually represented information.

5. The interactive organizational tool of claim 3, wherein the fourth level of visually represented information further comprises interactions of said work positions.

6. The online drill down interactive tool of claim 1 wherein for each of said work positions said tasks and said interrelationships between work positions differ.

7. The online drill down interactive tool of claim 1 wherein edits to a first of said tasks for a first of said work positions affects a second of said tasks for a second of said work positions.

8. A drill down interactive tool implemented by a computer program executed by one or more processors for defining steps necessary to complete an objective within an organization having at least one department, the drill down interactive tool comprising:
   a first level of externally accessible information, said information comprising a plurality of major tasks to accomplish an objective;
   a second level of externally accessible information for each of said major tasks that identifies departments of the organization that must perform at least one sub-task to complete each of said major tasks by highlighting icons that correspond to said departments;
   a third level of externally accessible information for each of said departments that identifies each individual job within said departments that must perform said at least one sub-task to complete the major task;

a fourth level of externally accessible information for each of said individual jobs comprising a plurality of specific sub-tasks comprising said at least one sub-task needed to complete the major task; and wherein any one of said first through fourth levels are viewed via windows that may be accessed from a preceding or a succeeding level.

9. The drill down interactive tool of claim 8, further comprising a fifth level of externally accessible information for each of said plurality of specific sub-tasks defining at least one required work product.

10. The drill down interactive tool of claim 9, further comprising a sixth level of externally accessible information having a plurality of documents for each of said fifth levels.

11. The interactive organizational tool of claim 8, wherein the first, second, and third levels are accessible to the entire organization.

12. An online drill down interactive tool implemented by a computer program executed by one or more processors for defining steps necessary to complete an objective comprising:

a map window having a plurality of major tasks organized on a timeline that define how to accomplish the objective, each major task identifying specific jobs that have at least one sub-task necessary to complete one of the plurality of major tasks;

a task window for each job identified by the map window, the task window including at least one of said sub-tasks organized on the timeline that is needed to complete said one of the plurality of major tasks;

and wherein the task windows are accessible by selecting one of the plurality of major tasks from the map window, wherein each of the plurality of major tasks includes a plurality of icons that represent groups within the organization, wherein members of said plurality of icons are highlighted when respective groups have incomplete tasks;

and wherein for each of the plurality of major tasks at least one of the plurality of icons are selectable by a user that represents specific individual jobs or departments that have at least one task to perform to complete one of the plurality of major tasks.

13. The online drill down interactive tool of claim 12, wherein selecting a highlighted icon leads to the task window if the icon represents at least one of said sub-tasks and leads to a second plurality of selectable icons if the icon represents the at least one department.

14. The online drill down interactive tool of claim 13, wherein the second plurality of icons represent specific jobs, and a selectable icon represents a specific job having at least one task to perform relating to said one of the plurality of major tasks.

15. The online drill down interactive tool of claim 12, wherein each sub-task in the task window includes a list that defines how to accomplish each sub-task.

16. The online drill down interactive tool of claim 15, wherein each sub-task includes a link to one of a plurality of interdependency charts.

17. The online drill down interactive tool of claim 16, wherein each of said plurality of interdependency charts includes a link to a plurality of documents, the plurality of documents accessible by more than one of said plurality of interdependency charts.

* * * * *